United States Patent [19]

Wilson

[11] Patent Number: 5,619,935
[45] Date of Patent: Apr. 15, 1997

[54] PORTABLE INCINERATOR HEAT RECOVERY DEVICE AND METHOD OF USE

[75] Inventor: Donald L. Wilson, Carmi, Ill.

[73] Assignee: Elastec, Inc., Carmi, Ill.

[21] Appl. No.: 583,826

[22] Filed: Jan. 11, 1996

[51] Int. Cl.$^6$ ............................................. F23G 5/00
[52] U.S. Cl. .......................... 110/241; 110/346; 126/6; 126/66; 237/53
[58] Field of Search .................... 110/234, 240, 110/241, 297; 126/6, 61, 66, 67; 454/188, 189, 190, 192

[56] References Cited

U.S. PATENT DOCUMENTS

| | | | |
|---|---|---|---|
| 1,736,963 | 11/1929 | Bullock | 126/225 |
| 4,138,985 | 2/1979 | Marley | 126/6 |
| 4,194,688 | 3/1980 | Cobos | 237/53 |
| 4,217,878 | 8/1980 | Wieweck | 126/110 |
| 4,461,274 | 7/1984 | Cauffman | 126/77 |

Primary Examiner—Henry A. Bennett
Assistant Examiner—Pamela A. O'Connor
Attorney, Agent, or Firm—Woodard, Emhardt, Naughton, Moriarity & McNett

[57] ABSTRACT

A heat recovery device for use with a portable incinerator. The heat recovery device comprises first and second legs which support a heat exchanger thereon. An air flow path is formed from the bottom to the top of the first leg, through the heat exchanger and from the top to the bottom of the second leg. An open space is provided between the two legs and below the heat exchanger. A portable incinerator may be placed within this open space. When solid waste is burned within the incinerator, the exhaust port of the incinerator lies below the heat exchanger. A blower attached to the lower portion of the first leg creates air flow through the heat recovery device such that the air is heated in the heat exchanger by heat produced from the exhaust port of the portable incinerator. A tube is then coupled to the second leg in order to direct the heated air flow to the interior of an adjacent building. The present invention therefore allows solid waste to be burned and the heat thereby produced is recovered for heating of the building. However, it is not necessary to exit the building every time it is desired to dispose of solid waste. Instead, the solid waste is collected within the portable incinerator inside the building and the portable incinerator is installed in the heat recovery device only when a sufficient quantity of solid waste has been collected for incineration.

15 Claims, 7 Drawing Sheets

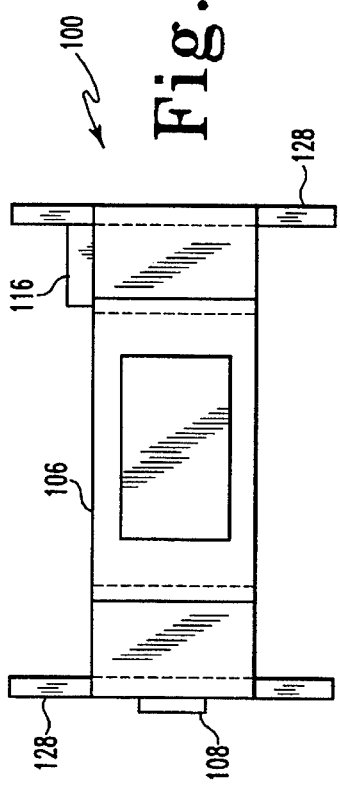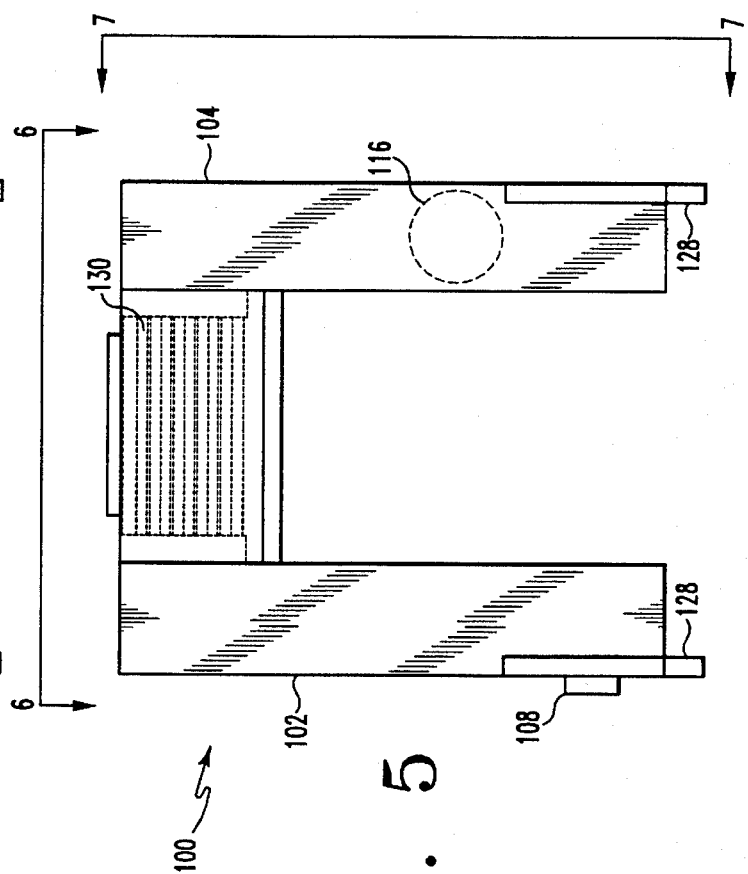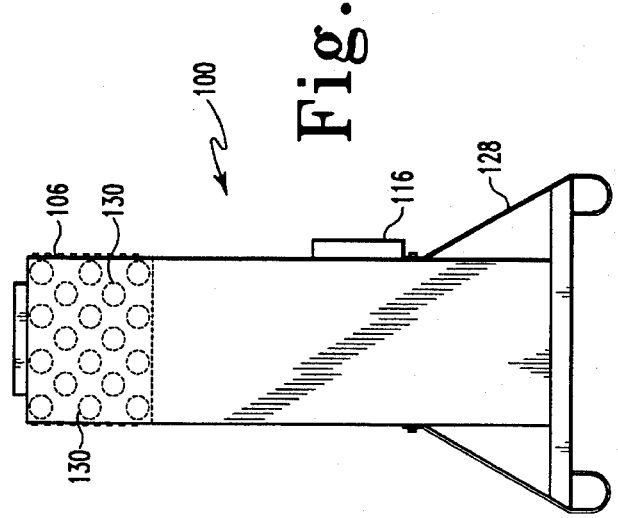

PORTABLE INCINERATOR HEAT RECOVERY DEVICE AND METHOD OF USE

TECHNICAL FIELD OF THE INVENTION

The present invention generally relates to trash incinerators and, more particularly, to a heat recovery device for use with a portable incinerator.

BACKGROUND OF THE INVENTION

In many applications, particularly in industrial applications, it is very desireable to burn solid waste materials rather than to transport them off-site for disposal, generally in landfills. This is particularly true for oily solid waste such as oil absorbents, oily rags and used oil filters. Environmental Protection Agency (EPA) regulations place strict disposal requirements and long term liability for the disposal of such items. However, Section 279, subpart C of the EPA regulations allows mixtures of used oil and solid waste (e.g. natural or synthetic sorbent materials, rags and oil filters) to be burned for heat recovery with no permitting requirements. Incineration of these items is therefore highly desirable to the oily waste producer.

Prior art incineration techniques may generally be classified as either fixed installations or portable incinerators. A typical prior art portable incinerator is illustrated in FIG. 1 and indicated generally at 10. The incinerator 10 incorporates a standard 55 gallon open head drum 12 as the primary combustion chamber. Waste material 14 which is to be combusted is placed into the drum 12. The drum 12 is secured to a portable cart 16 by means of a chain 18 which encircles the drum 12 and attaches to either side of the cart 16. The cart 16 is provided with an axle and two wheels 20 which enable the portable incinerator 10 to be easily moved from place to place. The cart 16 is further provided with two feet 39. A drum lid 22 is coupled to the top of the drum 12 by means of a plurality of clamp hooks 24. The lid 22 includes a secondary combustion chamber 26 therein. The cart 16 includes at least one electric blower motor 28 which introduces high velocity air into an airbox 30 attached to the cart 16. This high velocity air is coupled to the secondary combustion chamber 26 by means of an inlet air hose 32.

Once the waste material 14 has been set on fire, activation of the blower motor 28 introduces a high velocity air stream into the secondary combustion chamber and primary combustion chamber in order to create at the upper portion of the incinerator 10 a centrifugal swirl of combusting gases which burn the waste material 14 from the top down. In so doing, the incinerator 10 tends to retain the combustable waste material 14 for a long period of time, thereby effecting the substantially complete burning thereof. Combustion gases are released through an exhaust port 34. The incinerator 10 further includes a spark screen 36 at the exhaust port 34 and an air deflector 38 separating the primary and secondary combustion chambers.

The portable incinerator 10, and others similar to it in the prior art, have the advantage that they are easily portable and may be moved from place to place in order to collect the waste materials 14. However, due to the toxic nature of the combustion gases emitted from the exhaust port 34, the portable incinerator 10 must be moved to an outdoor location prior to ignition. This means that any heat generated by combustion of the waste material 14 is dispersed to the atmosphere. Since the unit is not being utilized for heat recovery (i.e. recycling of the oily waste), it does not qualify for the permitting exemption afforded by the EPA regulations. This exemption is only available when used oil and solid waste is burned for heat recovery.

The second prior art incineration technique is the fixed installation incinerator. A typical fixed installation incinerator is illustrated in FIG. 2 and indicated generally at 40. Incinerator 40 includes a combustion chamber 42 which is mounted in a fixed outdoor location. The combustion chamber 42 includes a door 44 which allows access to the interior thereof for placement of waste materials and ignition of these materials. A cold air inlet 46 allows air into the combustion chamber 42 in order to sustain the combustion of the waste materials. A screen 48 is placed over the air inlet opening in order to prevent unwanted foreign materials from entering the combustion chamber 42 and also to prevent escape of the solid waste materials from the combustion chamber 42. Exhaust gases produced by the combustion process escape from the combustion chamber 42 by means of the flue 50. The fixed incinerator 40 has the advantage that some of the heat produced by combustion of the solid waste material may be recovered in order to heat the adjacent building 52. In such a scenario, the combustion chamber 42 includes an internal air space which is not in contact with the combustion gases. Air is withdrawn from this internal air space by means of a blower fan 54 which introduces this air into the interior of the building 52 through the window panel 56. Radiant heat from the combustion of the solid waste material heats the air within the combustion chamber 42, and this air may be applied to the interior of the building 52 in order to recover heat from the combustion process.

The fixed incinerator 40 has the advantage that it allows heat to be recovered from the combusted waste materials. Not only is such heat valuable to the user of the building 52, it also allows the disposal of the waste material to qualify for the permitting exemption afforded by the EPA regulations. Both the heat recovery and the permitting exemptions are significant benefits for the user of the incinerator 40. However, the incinerator 40 has a serious disadvantage. It is necessary for the operator of the incinerator 40 to exit the building 52 every time it is desired that waste materials be discarded. In normal use, several trips will be made to the incinerator 40 with waste materials prior to the materials actually being incinerated within the incinerator 40. Because the heat recovery benefits of the incinerator 40 are most valuable during the coldest weather, it is an extremely undesirable burden for the operator to have to leave the comfort of the building 52 every time waste materials must be discarded.

There is therefore a need in the prior art for a solid waste incinerator which incorporates the advantages of both types of prior art incinerators without exhibiting the disadvantages of either type. Furthermore, there is a need for such an incinerator to qualify for the permitting exemptions afforded by the EPA regulations when oily waste is burned for heat recovery. The present invention is directed toward meeting these needs.

SUMMARY OF THE INVENTION

The present invention relates to a heat recovery device for use with a portable incinerator. The heat recovery device comprises first and second legs which support a heat exchanger thereon. An air flow path is formed from the bottom to the top of the first leg, through the heat exchanger and from the top to the bottom of the second leg. An open space is provided between the two legs and below the heat exchanger. A portable incinerator may be placed within this open space. When solid waste is burned within the incinerator, the exhaust port of the incinerator lies below the heat exchanger. A blower attached to the lower portion of the first leg creates air flow through the heat recovery device such that the air is heated in the heat exchanger by heat produced from the exhaust port of the portable incinerator. A tube is then coupled to the second leg in order to direct the heated air flow to the interior of an adjacent building. The present invention therefore allows solid waste to be burned and the heat thereby produced is recovered for heating of the building. However, it is not necessary to exit the building every time it is desired to dispose of solid waste. Instead, the solid waste is collected within the portable incinerator inside the building and the portable incinerator is installed in the heat recovery device only when a sufficient quantity of solid waste has been collected for incineration.

In one form of the invention a heat recovery device for use with a portable incinerator is disclosed, comprising a plurality of walls defining an air flow path; a heat exchanger within the air flow path; wherein the plurality of walls define an opening adapted to receive the portable incinerator therein such that an exhaust port of the portable incinerator is positioned substantially under the heat exchanger; a blower having an outlet in communication with the air flow path; and means for coupling the air flow path to an interior of a space to be heated.

In another form of the invention a heat recovery device for use with a portable incinerator is disclosed, comprising a structure having an interior air flow path, wherein a shape of the structure allows the portable incinerator to be positioned under at least a portion of the structure such that hot exhaust gases from the portable incinerator heat the portion of the structure; a blower having an outlet in communication with the air flow path; and means for coupling the air flow path to an interior of a space to be heated.

In another form of the invention a method for recovering heat from a portable incinerator is disclosed, comprising the steps off (a) collecting material to be burned within the portable incinerator; (b) moving the portable incinerator in order to position the portable incinerator within a heat recovery device, wherein the heat recovery device includes a heat exchanger positioned substantially over an exhaust port of the portable incinerator; (c) igniting the material with the portable incinerator; (d) causing the air to flow through the heat exchanger, wherein the air is heated; and (e) causing the heated air to flow into an interior of a space to be heated.

BRIEF DESCRIPTION OF THE DRAWINGS

FIG. 5 is a second side elevational view of the first embodiment heat recovery device of the present invention.

FIG. 6 is a top plan view of the first embodiment heat recovery device of the present invention.

FIG. 7 is a third side elevational view of the first embodiment heat recovery device of the present invention.

DETAILED DESCRIPTION OF THE PREFERRED EMBODIMENTS

Figure 1:
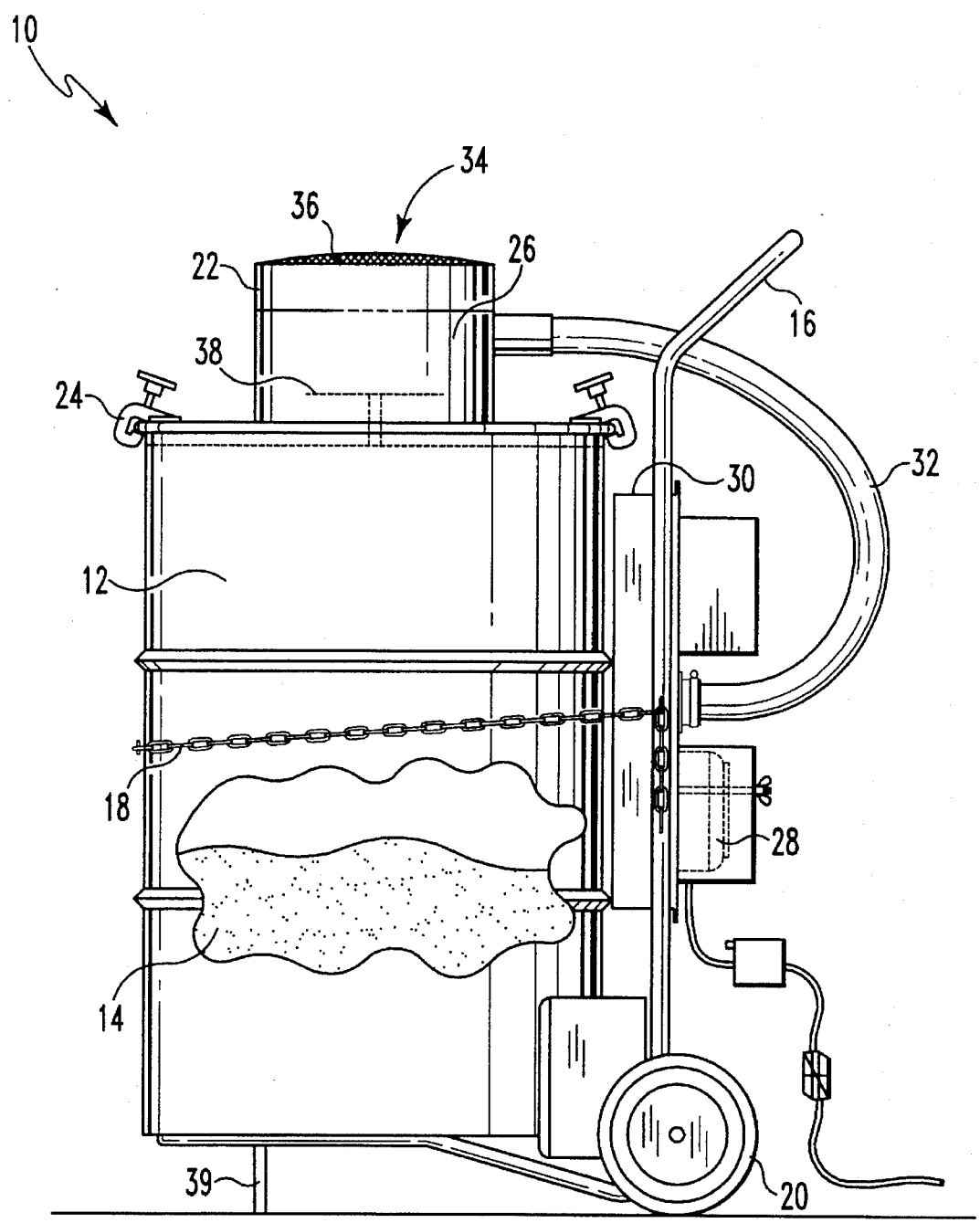
FIG. 1 is a side elevational view of a prior art portable incinerator.
Figure 2:
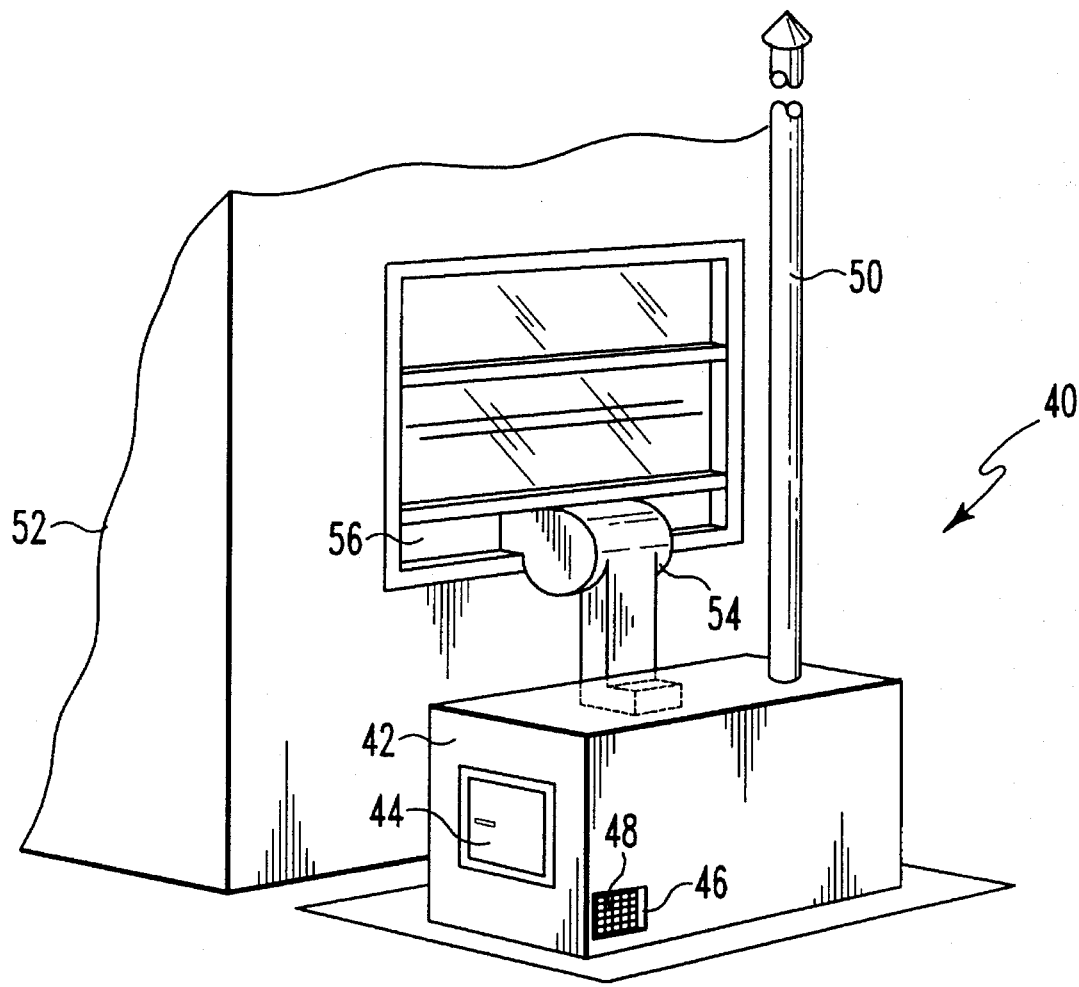
FIG. 2 is a perspective view of a prior art fixed incinerator.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
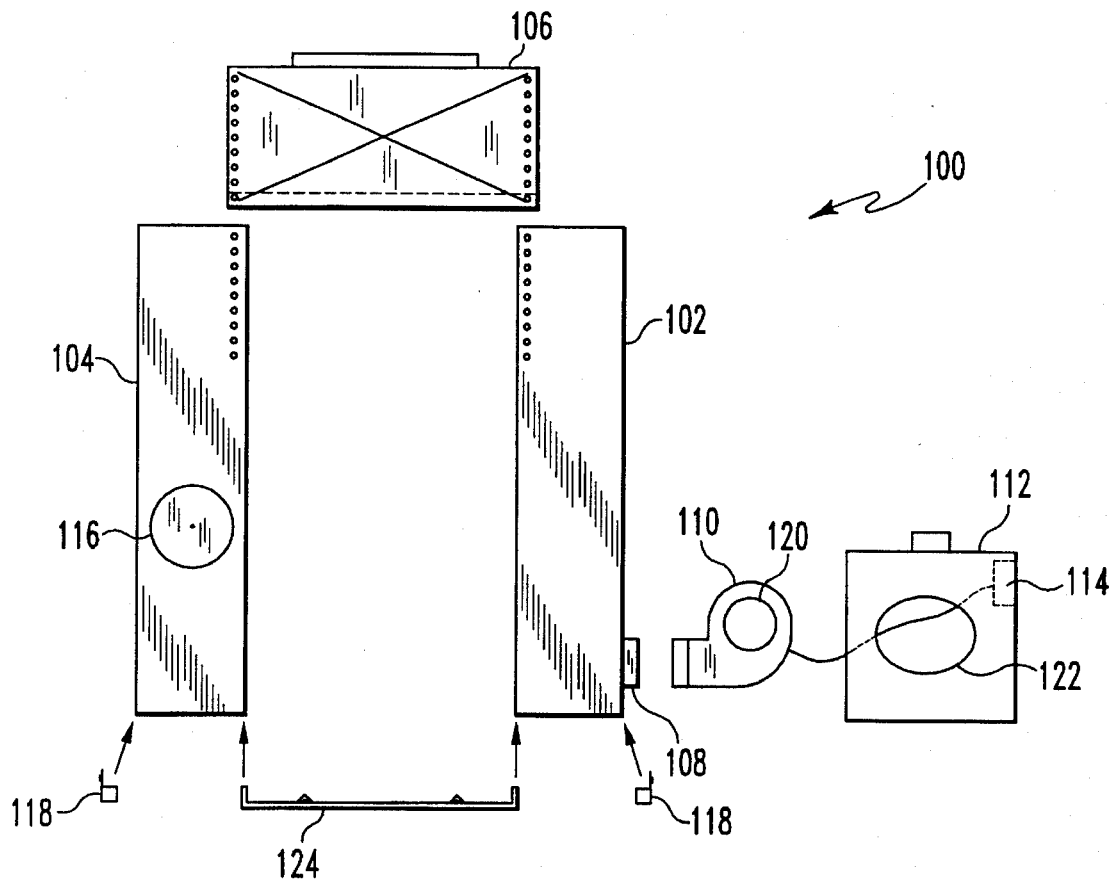
FIG. 3 is an exploded side elevational view of a first embodiment heat recovery device of the present invention.

Referring to FIG. 3, a first embodiment heat recovery device of the present invention is illustrated in exploded side elevational view, and indicated generally at 100. The heat recovery device 100 includes a first vertical leg 102 and a second vertical leg 104 spaced from the first leg 102. Each of the legs 102 and 104 is preferably formed from steel and includes a hollow space therein which will accommodate the flow of a stream of air. Legs 102 and 104 are preferably square or rectangular in cross-section. A stainless steel heat exchanger 106 couples the upper portions of the legs 102 and 104, such that there is an air flow path through the leg 102, the heat exchanger 106 and the leg 104. Air enters this flow path through the inlet port 108 and is forced therethrough by means of an electric or gas powered blower 110 which has a blower outlet coupled to the inlet port 108. The blower is covered by a protective blower housing 112 which protects the blower 110 from the environment and incorporates a blower on/off switch 114. Air enters the blower 110 through the blower inlet 120. A port 122 is formed in the lower cover 112 in order to allow access of air to the blower inlet 120. The air stream flowing through the heat recovery device 100 exits the device at outlet port 116 formed in the vertical leg 104. The legs 102 and 104 are preferably supported off of the ground surface by a pair of legs 118. A slide rail 124 is coupled to the inside bottom edges of the legs 102 and 104. The purpose of the slide rail 124 is described in greater detail hereinbelow. The blower 110 is preferably a 1200 cubic feet per minute blower, such as model no. 4c831, available from the Grainger Company of Evansville, Ind.

Figure 4:
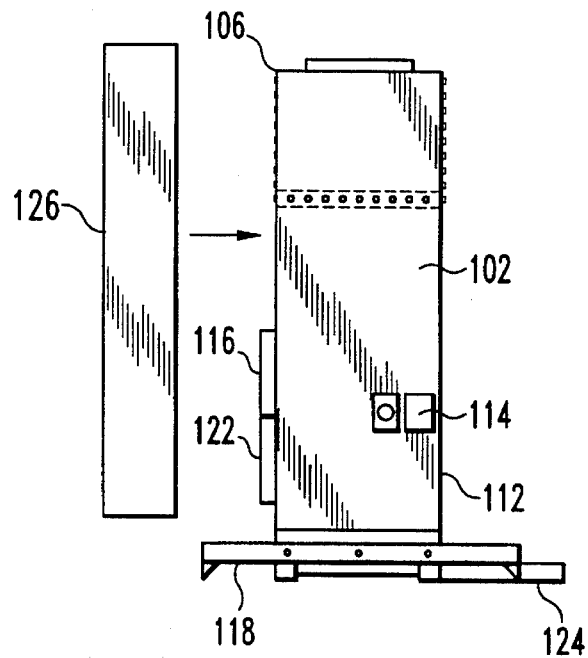
FIG. 4 is a first side elevational view of the first embodiment heat recovery device of the present invention.

Referring now to FIG. 4, the heat recovery device 100 is illustrated in a side elevational view. An optional heat shield 126 is illustrated in FIG. 4, the heat shield being mounted to the rear of the heat recovery device 100 in order to substantially enclose the opening between the vertical legs 102 and 104 on this side of the device 100. A second side elevational view of the heat recovery device 100 is illustrated in FIG. 5. Alternative style feet 128 are illustrated in the view of FIG. 5. As shown in phantom, the heat exchanger 106 includes a plurality of tubes 130 which provide the air flow coupling between the legs 102 and 104. The bottom 132 of the heat exchanger 106 is open. A top plan view of the heat recovery device 100 is illustrated in FIG. 6, while a third side elevational view of the heat recovery device 100 is illustrated in FIG. 7. The tubes 130 of the heat exchanger 106 are illustrated in phantom in the view of FIG. 7.

Figure 8:
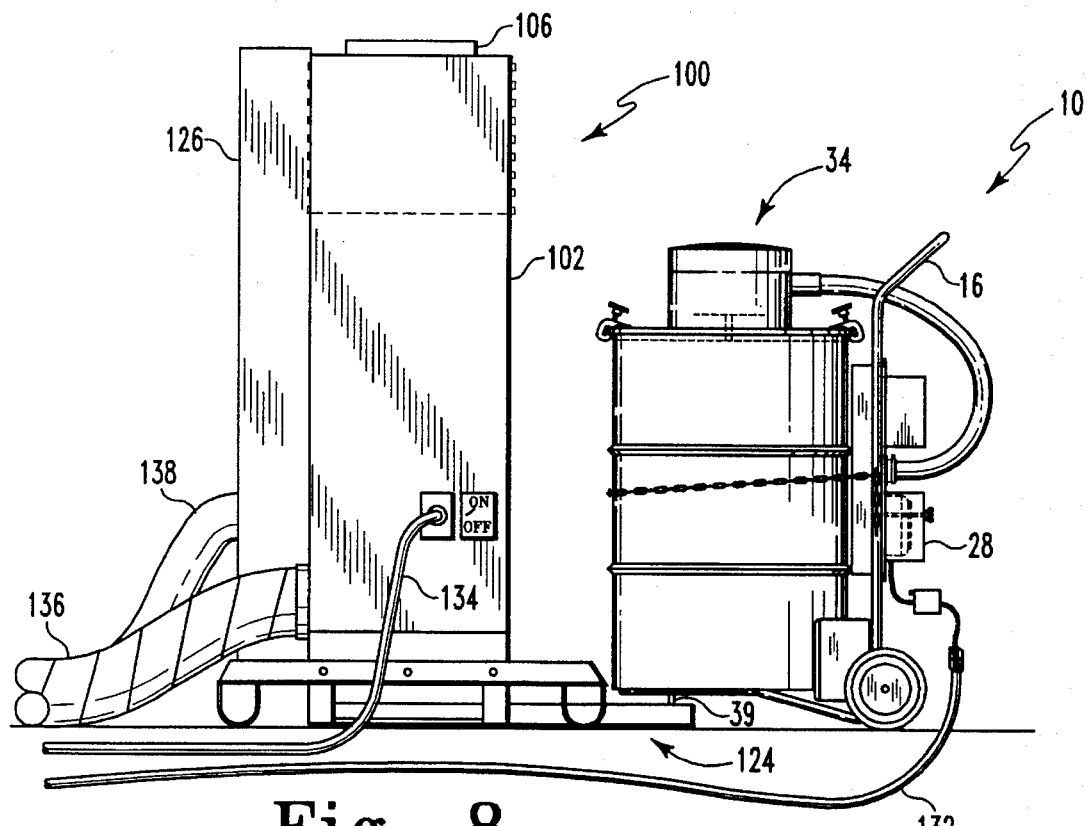
FIG. 8 is a side elevational view of a prior art portable incinerator and the first embodiment heat recovery device of the present invention.
Figure 9:
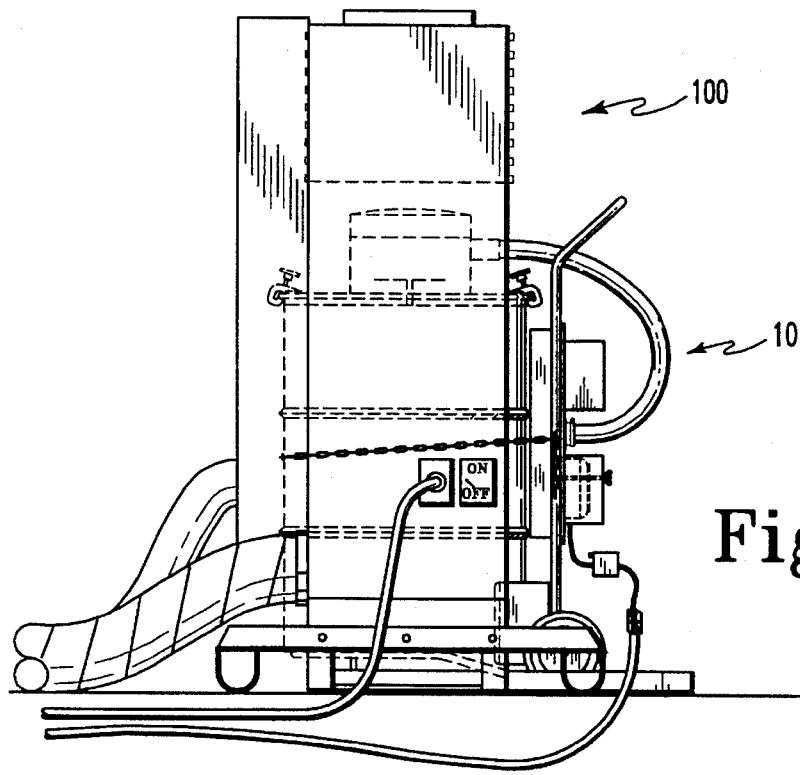
FIG. 9 is a side elevational view of the first embodiment heat recovery device of the present invention in use with a prior art portable incinerator.
Figure 10:
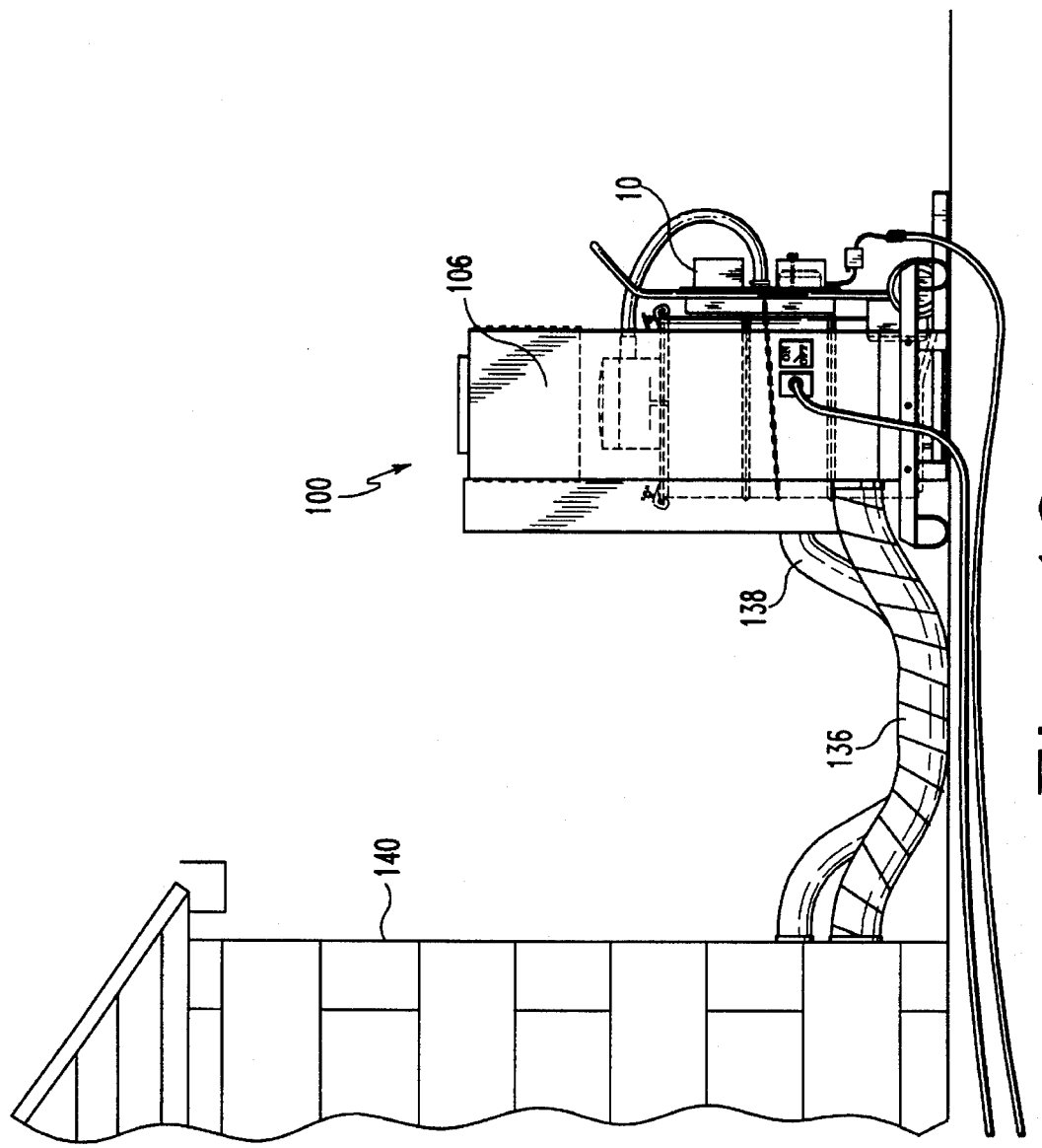
FIG. 10 is a first side elevational view of the first embodiment heat recovery device of the present invention coupled to a building structure.

Use of the heat recovery device 100 is illustrated in FIGS. 8 and 9. The portable incinerator 10 of FIG. 1 is kept within the structure where the oily solid waste is produced and serves as a convenient receptacle for such waste. When the portable incinerator 10 has been filled with a sufficient amount of such oily solid waste, it is wheeled outside to the location of the heat recovery device 100. The feet 39 of the cart 16 are placed upon the slide rails 124. A source of electrical power 132 is coupled to the portable incinerator 10 and the contents thereof are ignited. The blower 28 is activated and creates an intense combustion of the solid waste materials within the incinerator 10. Extremely hot combustion gases are exhausted through the exhaust port 34. Once the incinerator 10 has been ignited, it is slid on the slide rails 124 until the exhaust port 34 is positioned directly under the heat exchanger 106, as shown in FIG. 9. At this time, the blower 110 of the heat recovery device 100 is started. The blower 110 is powered by a source of electrical power 134. The blower 110 suctions air from within the structure to be heated by means of conduit 136 coupled to the inlet port 122. Heated air exiting the heat recovery device 100 is coupled to the interior of the structure to be heated by means of conduit 138 coupled to exhaust port 116 of leg 104. Coupling of the heat recovery device 100 to the structure to be heated 140 is illustrated in FIG. 10. Suitable apertures are formed in a wall of the structure 140 in order to fit the inlet and outlet hoses 136 and 138 thereto.

Figure 11:
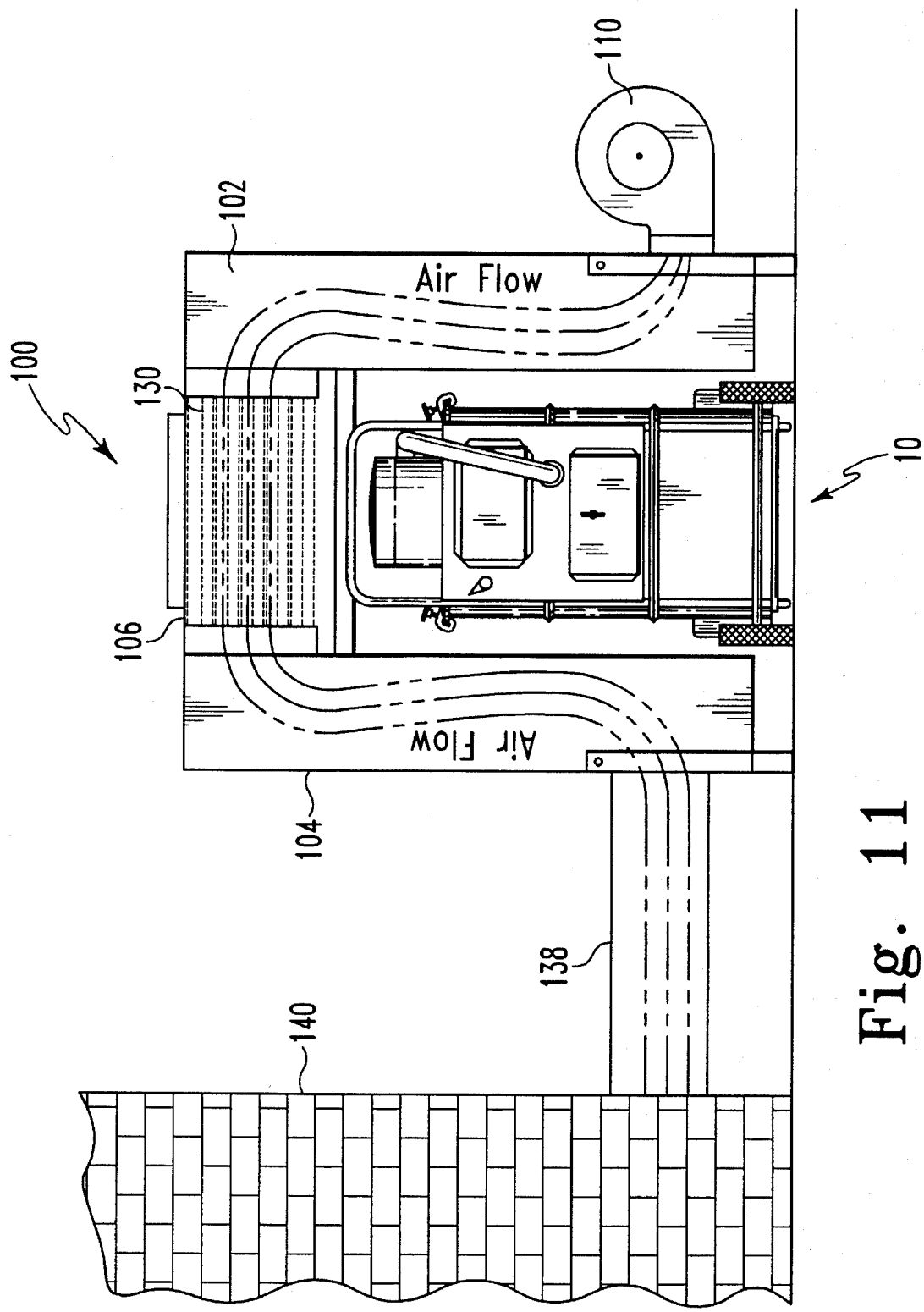
FIG. 11 is a second side elevational view of the first embodiment heat recovery device of the present invention coupled to a building structure.

As best illustrated in FIG. 11, the blower 110 suctions air from within the structure 140 through the conduit 136 (not shown in FIG. 11) and forces this air into the interior of the vertical leg 102. The air then flows through the tubes 130 of the heat exchanger 106 and into the interior of the vertical leg 104. The exhaust port 34 of the portable incinerator 10 is positioned directly below the tubes 130 of the heat exchanger 106. Therefore, the hot combustion gases which are exhausted from the portable incinerator 10 heat up the tubes 130, which have a relatively very large surface area. This heat is transferred to the air flowing through the tubes 130 in a heat exchanging process. Therefore, the air which is circulated through the heat recovery device 100 is heated by the heat generated in incinerating the oily solid waste within the portable incinerator 10. Furthermore, much of the radiant heat which escapes from the sides of the portable incinerator 10 will heat the vertical legs 102 and 104, thereby further scavaging heat into the air flow. The incorporation of the heat shield 126 to the rear of the heat recovery device 100 further concentrates the heated exhaust gases from the portable incinerator 10 in the area of the heat exchanger 106.

Continued pumping of air into the interior of the heat recovery device 100 causes the heated air to exit the port 116 and flow through the conduit 138 into the structure 140, thereby heating the interior of the structure 140. Because of the relatively large surface area of the tubes 130 of the heat exchanger 106, the heat recovery device 100 is very efficient at transferring the heat from the combustion process within the portable incinerator 10 to the air stream flowing through the interior of the heat recovery device 100. The production of heated air for the interior of the structure 140 is further enhanced by the use of room temperature air from within the structure 140 as the air source for the blower 110. As a result, the heat recovery device 100 does not waste heat in heating very cold outside air prior to delivering this air to the interior of the structure 140.

The heat recovery device of the present invention therefore provides a very efficient source of supplemental heat for the structure 140. Much of the energy contained within the oily solid waste 14 within the portable incinerator 10 is recovered and put to a desirable use rather than being dispersed to the environment. Such heat recovery allows the oily solid waste to be burned without any permitting requirements under current EPA regulations. A further advantage provided by the heat recovery device 100 is that it is used with a portable incinerator 10. This has the advantage that the incinerator 10 may be kept within the structure 140 for convenient collection of oily solid waste. It is only necessary to bring the solid waste to the heat recovery device 100 at the exterior of the structure 140 when a sufficient amount has been collected within the incinerator 10 for combustion. This is a very desirable feature, owing to the fact that the heat recovery device is most useful during very cold and inclement weather conditions. Those skilled in the art will therefore recognize that the heat recovery device 100 of the present invention offers many advantages and improvements over prior art incinerators.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A heat recovery device for use with a portable incinerator, comprising:

a plurality of walls defining an air flow path;

a heat exchanger within the air flow path;

wherein the plurality of walls define an opening adapted to receive the portable incinerator therein such that an exhaust port of the portable incinerator is positioned substantially under the heat exchanger;

a blower having an outlet in communication with the air flow path; and means for coupling the air flow path to an interior of a space to be heated.

2. The heat recovery device of claim 1, wherein the plurality of walls are formed from steel.

3. The heat recovery device of claim 1, wherein the heat exchanger comprises a plurality of tubes, wherein interiors of the tubes are in communication with the air flow path.

4. The heat recovery device of claim 1, further comprising:

means for coupling an inlet of the blower to the interior of the space to be heated.

5. The heat recovery device of claim 1, further comprising:

a heat shield coupled to the plurality of walls and substantially covering one side of the opening.

6. The heat recovery device of claim 1, further comprising:

at least one slide rail adapted to facilitate sliding of the portable incinerator thereon as the portable incinerator is moved into the opening.

7. The heat recovery device of claim 1, wherein the plurality of walls are positioned to absorb radiant heat emitted from the portable incinerator.

8. A heat recovery structure for use with a portable incinerator, comprising:

said structure having an interior air flow path, wherein the structure is adapted to receive the portable incinerator under at least a portion of the structure such that hot exhaust gases from the portable incinerator heat the portion of the structure;

a blower having an outlet in communication with the air flow path; and means for coupling the air flow path to an interior of a space to be heated;

wherein the portion of the structure includes a heat exchanger.

9. The heat recovery device of claim 8, wherein the heat exchanger comprises a plurality of tubes, wherein interiors of the tubes are in communication with the air flow path.

10. The heat recovery device of claim 8, further comprising:

means for coupling an inlet of the blower to the interior of the space to be heated.

11. The heat recovery device of claim 8, further comprising:

at least one slide rail adapted to facilitate sliding of the portable incinerator thereon as the portable incinerator is positioned substantially under the heat exchanger.

12. The heat recovery device of claim 8, wherein the structure is adapted to absorb radiant heat emitted from the portable incinerator.

13. A method for recovering heat from a portable incinerator, comprising the steps of:

(a) collecting material to be burned within the portable incinerator;

(b) moving the portable incinerator in order to position the portable incinerator within a heat recovery device, wherein the heat recovery device includes a heat exchanger positioned substantially over an exhaust port of the portable incinerator;

(c) igniting the material with the portable incinerator;

(d) causing the air to flow through the heat exchanger, wherein the air is heated; and (e) causing the heated air to flow into an interior of a space to be heated.

14. The method of claim 12, wherein said collecting step is performed within the space to be heated.

15. The method of claim 12, wherein said causing the air to flow step further comprises:

(a) suctioning air from the space to be heated; and (b) blowing the suctioned air into the heat exchanger.

* * * * *

UNITED STATES PATENT AND TRADEMARK OFFICE
CERTIFICATE OF CORRECTION

PATENT NO. : 5,619,935

DATED : April 15, 1997

INVENTOR(S) : Donald L. Wilson

It is certified that error appears in the above-identified patent and that said Letters Patent is hereby corrected as shown below:

In column 2, line 1, please change "off" to --oil--.

In column 3, line 38, please change "off" to --of:--.

In column 8, lines 17 and 19, please change "12" to --13--.

Signed and Sealed this

Fourth Day of November, 1997

Attest:

BRUCE LEHMAN

Attesting Officer    Commissioner of Patents and Trademarks